(No Model.)
L. A. JOHN.
COMBINED HARROW AND CULTIVATOR.
No. 289,659. Patented Dec. 4, 1883.
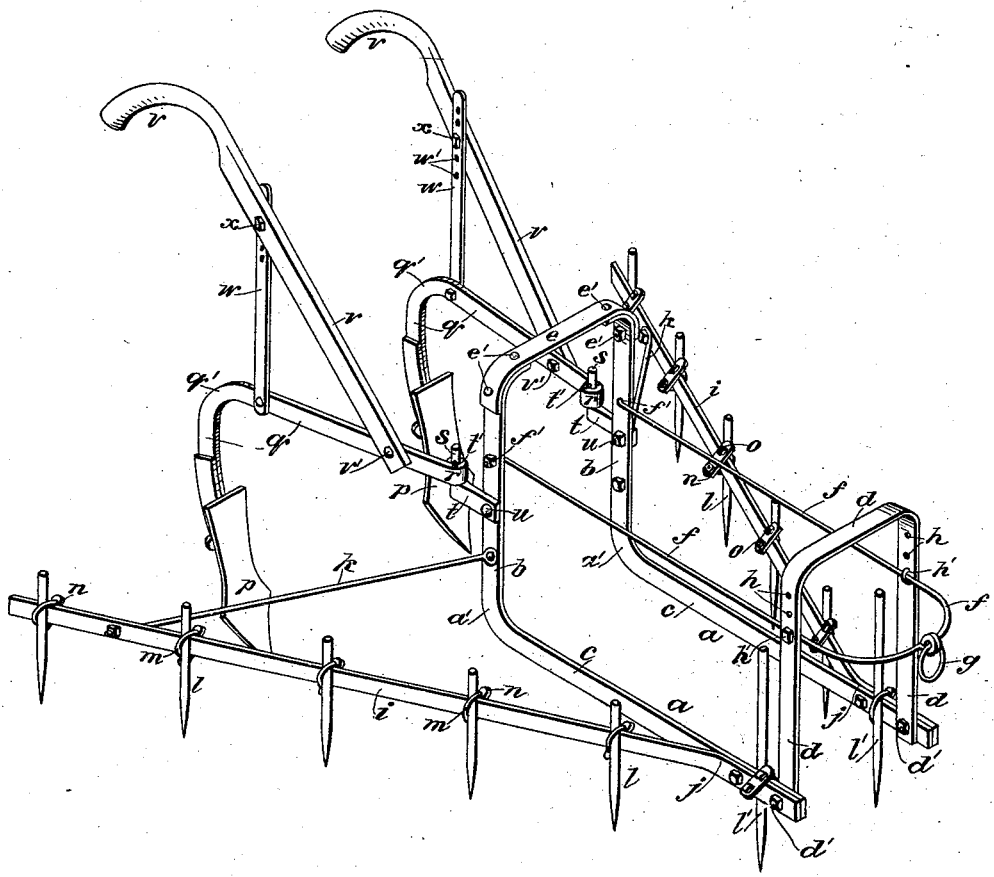
WITNESSES:
INVENTOR:
L. A. John
BY
ATTORNEYS.

UNITED STATES PATENT OFFICE.

LEWIS A. JOHN, OF DUNLAP, KANSAS.

COMBINED HARROW AND CULTIVATOR.

SPECIFICATION forming part of Letters Patent No. 289,659, dated December 4, 1883.

Application filed August 21, 1883. (No model.)

*To all whom it may concern:*

Be it known that I, LEWIS A. JOHN, of Dunlap, in the county of Morris and State of Kansas, have invented a new and Improved Combined Harrow and Cultivator, of which the following is a full, clear, and exact description.

The object of my invention is to provide a simple, strong, durable, and easily-handled harrow and cultivator for use in tilling the soil around corn, cotton, and other standing crops.

Reference is to be had to the accompanying drawing, forming part of this specification, in which the figure is a perspective view of my improved harrow and cultivator.

I make the frame of the machine, to which the harrow and cultivator shovel-beams connect, of the bars $a$, which bend at about right angles at $a'$ to form the standards $b$ and the forward horizontal bars, $c$. An arched bar, $d$, connects the forward ends of the frame-bars $c$ by bolts $d'$, and a head-piece or cross-bar, $e$, connects by bolts $e'$ the upper ends of the standards $b$, to which the ends of the draft, clevis $f$ are bolted at $f'$, said clevis extending along to and beyond the front arched bar, $d$, and having at its front the draft-clip or ring $g$. The bar $d$ has a series of holes, $h$, at each side, in which the bolts $h'$, that secure the clevis at each side, may be shifted to regulate the depth at which the harrow shall work in the soil. The long clevis $f$ thus serves as a brace to the bars $a$ of the frame. The bolts $e'$ $f'$ $d'$ $h'$ may readily be removed to permit the frame-bars $a$ to be packed close together for economy of space in transportation, or when the machine is stowed away when out of use, and when the frame is set up and bolted together it forms a light-appearing but substantial structure, well calculated to resist the strains of use.

I rigidly connect the harrow-beams $i$—one at each side—to the forward ends of the frame-bars $c$, either by forging or bolting, said beams $i$ bending from the frame at $j$ and inclining outward and backward therefrom, and being stayed strongly to the frame-standards $b$ by the braces $k$ at the rear. The harrow-beams $i$ have teeth $l$, secured in place by the clips $m$, which cross the teeth diagonally downwardly from the front to the rear sides of the teeth, to stay them when at work, the clips $m$ being held firmly to beams $i$ by the plates $n$ and nuts $o$, screwed on the ends of the clips. The teeth $l$ may thus easily be removed and replaced when broken, or the number of the teeth on each beam be regulated as circumstances shall require. I provide long teeth $l'$ at the front of the harrow, which teeth may be set with their points low down to the bottom of the furrow when the machine is used in cultivating listed corn.

The cultivator shovels or plows $p$, which may be of any approved form, have any suitable connection with the plow standard or beams $q$, which preferably curve backward and upward from the plows, and then bend forward at $q'$ and connect loosely by eyes $r$ with the pintles $s$ of the hinge-plates $t$, which plates are themselves hinged to the frame-bars $b$ at $u$. Pins $t'$ in pintles $s$ prevent disconnection of beams $q$. Handles $v$ are bolted to the plow standards or beams $q$ at $v'$, and braces $w$ connect the rear ends of the handles with the beams, the braces having a series of holes, $w'$, in which the fastening-bolts $x$ may be shifted to accommodate the handles to the height of the workman.

It is evident that upon seizing the handles $v$ $v$ the plows $p$ $p$ may be swung freely on the pins $s$ as pivots to either side, or closer together, or farther apart, as any particular crop shall require, and that the plows $p$ $p$ may at the same time be lowered or raised by a vertical play of the hinge-plates $t$ on their pivots $u$, thereby providing for every possible condition of the crop or the soil, and enabling the workman to heap up about the plants just the right quantity of earth which has been previously cleared, loosened, and freshened by the travel of the harrow over it, the work of cultivation being thoroughly done at a great economy of time and labor over the use of machines of this class as commonly constructed.

I do not abandon or dedicate to the public any patentable feature set forth herein and not hereinafter claimed, but reserve the right to claim the same either in a reissue of any patent that may be granted upon this application or in any other application for Letters Patent that I may make.

Having thus fully described my invention, I claim as new, and desire to secure by Letters Patent—

1. In a combined harrow and cultivator, the frame consisting of angular bars $a\ a'$ joined at the front by arched bar $d$ and at the rear by the cross-bar $e$, the joints at $e'\ d'$ being detachable, substantially as shown and described.

2. The combination, with the angular frame-bars $a\ a$, the forward arched bar $d$, and rear cross-bar, $e$, detachably connected to bars $a$, of the draft-clevis $f$, connecting with the frame at $f'$, and adjustably at $h'\ h'$, substantially as shown and described.

3. The combination, with the frame and clevis $a\ d\ e\ f$, of the harrow-beams $i\ i$, connecting directly with the frame-bars $a\ a$ at the front, inclining outward and backward, and stayed from the frame by braces $k\ k$ at the rear, substantially as shown and described.

4. The combination, in a combined harrow and cultivator, of the frame $a\ d\ e$, draft-clevis $f$, toothed harrow-beams $i\ l$, braced to the frame at $k$, the following cultivator-plows $p$, fitted on standards $q$, so as to swing laterally and vertically, and the handles $v$, substantially as shown and described.

LEWIS A. JOHN.

Witnesses:
C. E. KIDD,
ERWIN D. BULEN.